United States Patent
Chen

(10) Patent No.: US 12,440,315 B2
(45) Date of Patent: Oct. 14, 2025

(54) IMPLANTATION KIT ENABLING IMPLANT HOLE PREPARATION ON BONE IN ONLY ONE DRILLING WITH ONE SINGLE OSTEOTOME

(71) Applicant: Chun-Leon Chen, Taipei (TW)

(72) Inventor: Chun-Leon Chen, Taipei (TW)

( * ) Notice: Subject to any disclaimer, the term of this patent is extended or adjusted under 35 U.S.C. 154(b) by 292 days.

(21) Appl. No.: 17/882,155

(22) Filed: Aug. 5, 2022

(65) Prior Publication Data
US 2023/0085400 A1  Mar. 16, 2023

(51) Int. Cl.
*A61C 8/00* (2006.01)
*A61B 17/16* (2006.01)

(52) U.S. Cl.
CPC ........ *A61C 8/0089* (2013.01); *A61B 17/1615* (2013.01)

(58) Field of Classification Search
CPC .. A61B 17/1615; A61C 8/0025; A61C 8/0022
See application file for complete search history.

(56) References Cited

U.S. PATENT DOCUMENTS

| | | | |
|---|---|---|---|
| 2011/0238071 A1* | 9/2011 | Fernandez-Scoma | A61C 1/084 606/80 |
| 2013/0244202 A1* | 9/2013 | Chen | A61C 8/0022 433/165 |
| 2015/0086942 A1* | 3/2015 | Hwang | A61C 8/0069 433/174 |
| 2016/0220334 A1* | 8/2016 | Chen | A61C 8/0092 |
| 2019/0374314 A1* | 12/2019 | Chen | A61B 17/1673 |

* cited by examiner

*Primary Examiner* — Yogesh P Patel
*Assistant Examiner* — Courtney N Huynh
(74) *Attorney, Agent, or Firm* — Rabin & Berdo, P.C.

(57) ABSTRACT

An implantation kit including a rotational osteotome and an implant is disclosed. The rotational osteotome includes a plurality of steps of different diametrical sizes, a tip, and at least one flute; and every step includes an annular bottom bevel to provide a cutting edge and recessed section. The implant includes a body having a cylindrical head section and a conical section provided with an external thread and a plurality of spiral flutes. The conical section has a downward tapered profile correspondingly aligned with the recessed sections. The cylindrical head section has a straight cylindrical profile matching that of the step having the largest diametrical size. With the above arrangements, an implant hole on a bone can be formed in only one drilling with one single osteotome for fixedly holding the implant therein. Therefore, the time needed for dental and orthopedic surgeries is largely shortened while better osseointegration can be achieved.

9 Claims, 17 Drawing Sheets

IMPLANTATION KIT ENABLING IMPLANT HOLE PREPARATION ON BONE IN ONLY ONE DRILLING WITH ONE SINGLE OSTEOTOME

FIELD OF THE INVENTION

The present invention relates to an implantation kit that enables implant hole preparation on bone in only one drilling with one single osteotome, and more particularly, to an implantation kit that includes a rotational osteotome having a stepped drill section, which has a profile matching that of an implant, so that an implant hole can be drilled into a bone in only one drilling with one single rotational osteotome for fixedly mounting the implant therein.

BACKGROUND OF THE INVENTION

There are three types of implants for medical purpose. The first type is applied in dentistry to replace a lost part of the human structure, such as a lost tooth; the second type is applied in dentistry to support a damaged part of the human structure, such as an atrophied alveolar bone; and the third type is applied in orthopedics to enhance an existed part of the human structure, such as a damaged joint or a broken bone.

Please refer to FIGS. 16A and 16B. With the constantly improved tooth repairing technology, artificial implants can be now used to repair a patient's defective teeth. In a general dental implantation surgery, first use a locating drill bit 70 to form a locating point 80 on the surface of a defective alveolar bone. Then, use a first hole drill bit 71 having the smallest diameter among a set of dental drill bits to drill and cut the locating point 80 into a first hole 81, and place a first detector 72 in the first hole 81 to check whether the first hole 81 is drilled in a skewed direction or not. If the first hole 81 is drilled in a correct drilling direction, a second hole drill bit 73, a third hole drill bit 74 and a fourth hole drill bit 75 having gradually increased diametrical sizes are used sequentially to drill the first hole 81 to form a second hole 82 that reaches a predetermined width and depth. Thereafter, use a second detector 76 to check whether the second hole 82 is drilled in a skewed direction or not. If the second hole is drilled in a correct drilling direction, use an expansion drill bit 77 to expand a top of the second hole 82. After the top of the second hole 82 is expanded, use a tap drill bit 78 to drill the second hole 82 for the latter to form a conical hole 83 having a threaded rail formed on inner wall surface thereof. Finally, screw a dental implant 79 along the threaded rail into the alveolar bone.

In the conventional dental implantation, multiple drill bits of different sizes are required to drill one implant hole into the alveolar bone. Therefore, the dental surgery is time-consuming and very difficult to complete. Further, during the process of hole drilling and cutting, the inner wall surface of the hole formed on the alveolar bone is in contact with the drill bits for a relatively long time. As a result, a large amount of heat is produced at the alveolar bone being drilled for implanting, and the heat would cause damage to the structure of the alveolar bone.

Further, to prevent the implant placed into the implant hole from moving relative to the alveolar bone, the dentist would select multiple drill bits having sizes matching the dimensions of the implant location and the implant to form a properly sized cutting hole on the alveolar bone. However, in the conventional dental implantation surgery, the error in the size and the depth of the drilled hole generally depends on the experience of the dentist. In the event the size of the drilled implant hole is too large, the implant placed into the implant hole tends to shake. For the implant to stay firmly in the large implant hole, the dentist has to take additional time to fill up extra space in the implant hole with some filler, which inevitably extends the operative time for placing the implant into the alveolar bone. On the other hand, in the event the size of the drilled implant hole is too small, a large amount of bone debris and heat would be produced in the process of placing the implant into the hole, which would cause difficulties in fixing the implant in the hole to similarly extend the operative time for completing the dental implantation.

SUMMARY OF THE INVENTION

A primary object of the present invention is to provide an implant kit that enables implant hole preparation in only one drilling with one single osteotome, and the completed implant hole is immediately ready for receiving an implant therein, so that optimal osseointegration between the implant and the implant hole on the bone can be achieved even the surgical operation is performed by an inexperienced surgeon and the implantation surgery can be completed with shortened time to achieve high surgical success rate.

Another object of the present invention is to provide an implantation kit, a rotational osteotome of which has a stepped profile corresponding to a tapered profile of an implant, so that the implant can be screwed into an implant hole formed by the rotational osteotome with least bone cutting. In this way, it is able to ensure good osseointegration between the implant and the bone and avoid broken bone due to excessive lateral stress exerted by the implant on the bone. The undesired situation of overheated bone may also be avoided.

A further object of the present invention is to provide an implantation kit, a rotational osteotome of which is provided with an eye-catching label to help a surgeon verify whether a bone drilling is completed and to maintain a consistent drilling depth by the rotational osteotome, so as to reduce man-made negligence.

A still further object of the present invention is to provide an implantation kit that includes a stepped rotational osteotome and a conical implant, both of which have the function of cutting laterally in the event the rotational osteotome or the implant undesirably advances in a skewed direction. Therefore, when the rotational osteotome or the implant is found to be in a skewed state, a surgeon can cause the osteotome or the implant to cut laterally and shift back to the correct cutting direction. Cooling water may be used in the process of implantation to maintain the rotational osteotome at a low drilling temperature and enable bone debris produced during bone drilling to be quickly discharged from different stepped positions formed on the rotational osteotome.

To achieve the above and other objects, the implantation kit enabling implant hole preparation on bone in only one drilling with one single osteotome according to the present invention includes a rotational osteotome and an implant. The rotational osteotome includes a shank section, a stopper section, and a drill section sequentially arranged from top to bottom in a drilling direction of the rotational osteotome. The shank section is connected to a rotary tool. The drill section is configured to include a plurality of axially spaced steps of different diametrical sizes, a tip, and at least one flute. The steps are arranged between the stopper section and the tip and give the drill section a stepped profile that is downward tapered in the drilling direction. The tip has an apex point formed at one side of the tip opposite to the stopper section; and the flute is extended from the steps to the tip in the drilling direction.

The implant includes a body, an external thread, and a plurality of spiral flutes.

The body includes a cylindrical head section and a conical section downward extended from the cylindrical head section. The cylindrical head section includes a socket formed on a top of the cylindrical head section; and the conical section has a bottom formed into a spherical surface. The external thread is formed around a round conical outer surface of the conical section and a round outer surface of the cylindrical head section. The spiral flutes are formed on the external thread to downward extend to the spherical surface and have a depth starting from a pitch circle of the external thread down into partial thickness of the conical section.

The steps respectively include an annular bottom bevel extended downward to a top of an adjacent lower one of the steps, such that the bevels respectively have a cutting edge and a recessed section. The external thread includes a plurality of blade edge sections and a plurality of blade body sections. The blade edge sections are located outside a stepped profile of the drill section and the blade body sections are partially located within the stepped profile of the drill section with remaining parts of the blade body sections located outside the stepped profile of the drill section. The cylindrical head section has a straight cylindrical profile that matches one of the steps having the largest diameter.

In a preferred embodiment, an implant hole is formed by the rotational osteotome into a bone, and the implant hole internally includes a plurality of sunken portions. The implant is fixedly placed in the implant hole with a gap formed between the implant and each of the sunken portions. The rotational osteotome is capable of being guided by the tip to advance in drilling direction, and the rotational osteotome is also capable of being guided by all the cutting edges to advance in a laterally skewed direction that intersects with the drilling direction.

The steps are respectively formed around a top of the step with a circumferential annular slot, the circumferential annular slot communicates with the at least one flute and is located adjacent to the recessed section of an upper one step, such that the bottom bevel of the upper step goes down to a bottom in radial direction of the circumferential annular slot of the lower one step to give the cutting edge of the upper step an increased cut length. The implant has a centered rotation axis and a section of the external thread formed on the round conical outer surface of the conical section is a coarse thread while another section of the external thread formed on the round outer surface of the cylindrical head section is a fine thread. Portions of the spiral flutes located closer to the fine thread are formed on the coarse thread only, while other portions of the spiral flutes located closer to the spherical surface are formed on both of the coarse thread and the conical section to be located deeper and closer to the centered rotation axis.

The stopper section of the rotational osteotome is in the form of a cylinder having a diameter larger than that of the steps of the drill section. A flat bottom surface of the cylinder includes a central surface portion connected to an uppermost step of the drill section and an annular surface portion located around the central surface portion to serve as stop means. Further, the stopper section of the rotational osteotome has an annular marking label provided around a circumferential outer surface of the stopper section.

The spiral flutes extend from the spherical surface to an upper end of the coarse thread located adjacent to the fine thread along a helical path, and the spiral flutes have a helical direction the same as the coarse thread. The rotational osteotome further includes an angular notch formed between each step and the at least one flute, such that a plurality of sharp-pointed tips are formed between the steps and the at least one flute.

The implantation kit further includes a guide board. The guide board includes at least one opening having a depth larger than or equal to a height of the stopper section and a diameter matching that of the stopper section, such that the stopper section can linearly move through the opening from a top of the guide board with a part of the stopper section extended beyond a bottom of the opening.

The present invention is characterized in that both of the conical section and the cylindrical head section of the implant are located within the stepped profile of the rotational osteotome, while the fine thread and the coarse thread of the implant are protruded from the stepped profile of the rotational osteotome. With these arrangements, the implant can be screwed into the implant hole with least bone cutting to enable good osseointegration between the bone and the implant and avoid broken bone due to a lateral stress exerted by the body of the implant on the bone. In this way, each implant hole can be formed on the bone in only one drilling with one single piece of the rotational osteotome for fixedly holding the implant therein. Therefore, the time needed for dental and orthopedic surgeries can be largely shortened while good osseointegration can be achieved.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
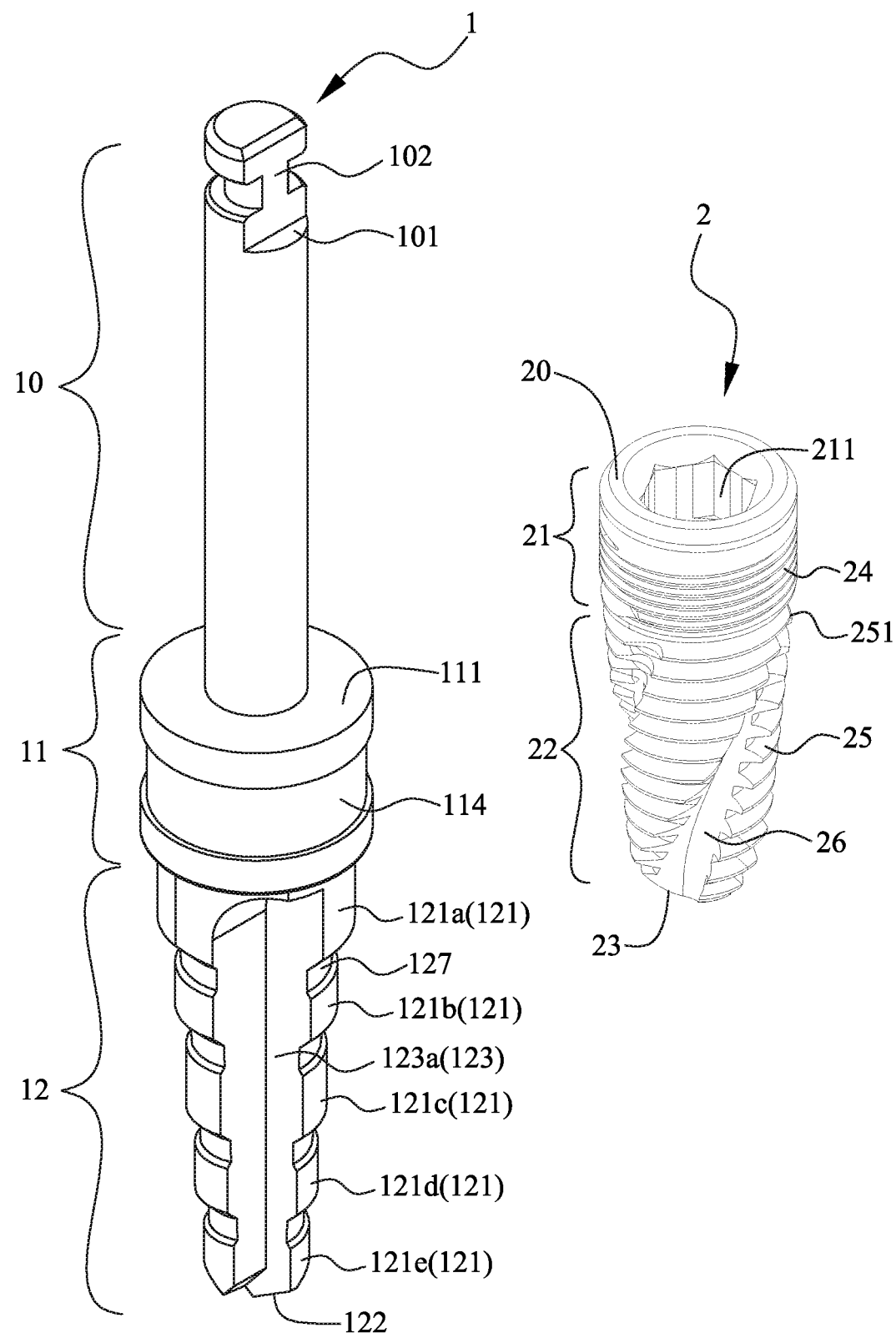
FIG. 1 is a perspective view of an implantation kit according to a preferred embodiment of the present invention that enables implant hole preparation on bone in only one drilling with one single osteotome.

The present invention will now be described with some preferred embodiments thereof and by referring to the accompanying drawings. For the purpose of easy to understand, elements that are the same in the preferred embodiments are denoted by the same reference numerals.

Please refer to FIG. 1. The present invention relates to an implantation kit enabling implant hole preparation on bone in only one drilling with one single osteotome, which is also briefly referred to as the implantation kit herein for the purpose of clarity and conciseness. As shown, the implantation kit includes a rotational osteotome 1 for performing a hole drilling operation and an implant 2 to be placed into the prepared hole in a subsequent implantation operation. The rotational osteotome 1 is installed on a rotary tool (not shown) and driven to rotate by the latter. When the rotational osteotome 1 in rotating is in contact with a patient's bone, such as the patient's alveolar bone 3, an implant hole 4 is formed on the alveolar bone 3 by the rotational osteotome 1 (see FIGS. 4-5). Thereafter, an implantation operation is performed to place the implant 2 into the implant hole 4. According to the present invention, a torsion force as high as 30N and more can be created between the implant 2 and the implant hole 4.

Figure 2:
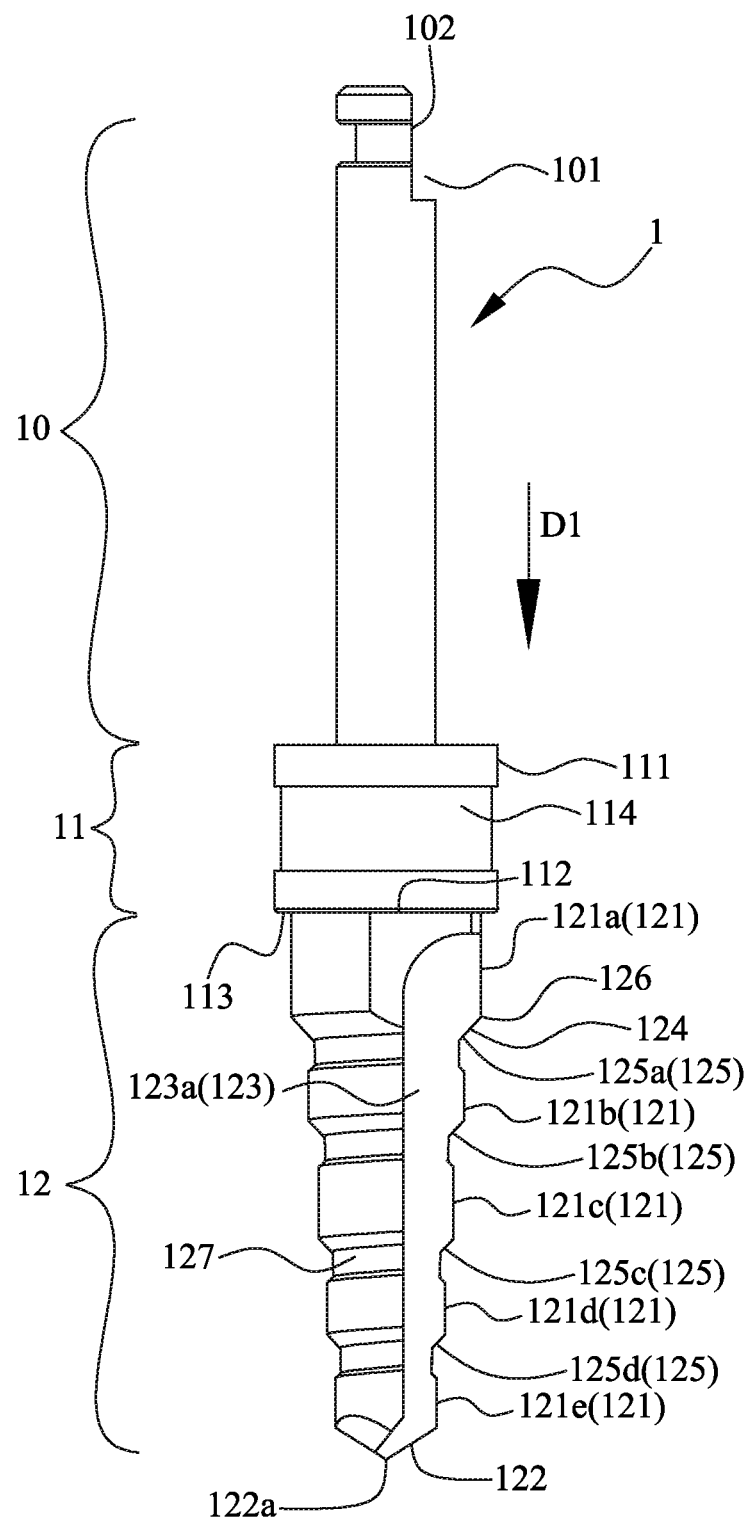
FIG. 2 is a side view of a rotational osteotome included in the implantation kit of FIG. 1.

Please refer to FIG. 2. The rotational osteotome 1 includes a shank section 10, a stopper section 11, and a drill section 12, which are sequentially arranged in a drilling direction D1 (see also FIG. 4). The shank section 10 has a setback portion 101 formed at a top thereof to provide a stop surface 102. The setback portion 101 is connected to a rotating shaft of the rotary tool. The stopper section 11 is in the form of a cylinder 111 having a diameter larger than that of the shank section 10 and the drill section 12. A flat bottom surface of the cylinder 111 includes a central surface portion 112, to which the drill section 12 is connected, and an annular surface portion 113 located around the central surface portion 112 to serve as stop means. Further, an annular marking label 114 showing a different color is provided on the cylinder 111 around a middle circumferential surface thereof for a doctor to conveniently check and confirm the completion of the drilling operation.

The drill section 12 is so configured that it includes a plurality of axially spaced annular steps 121 of different diametrical sizes, a tip 122, and a plurality of flutes 123. In the illustrated preferred embodiment of the present invention, a first, a second, a third, a fourth and a fifth step 121a, 121b, 121c, 121d, 121e are sequentially formed around the drill section 12 between the top section 11 and the tip 122 from top to bottom. The first step 121a has the largest diameter and the fifth step 121e has the smallest diameter, such that the five steps 121a-121e together give the drill section 12 a stepped profile 128 that is downward tapered in the drilling direction D1. The tip 122 is integrally formed on the fifth step 121e and includes an apex point 122a formed at one side thereof opposite to the stopper section 11.

Figure 3:
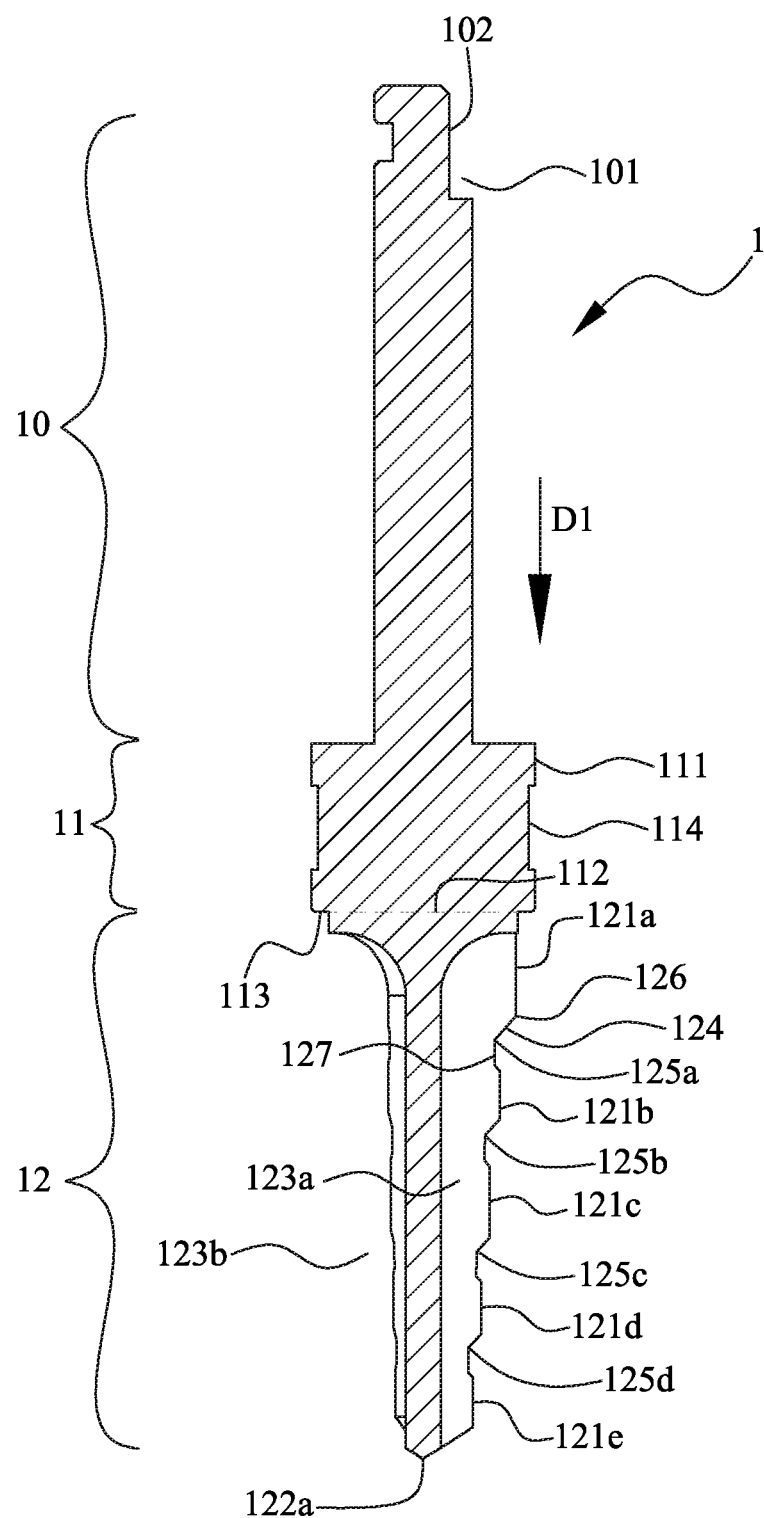
FIG. 3 is a sectional view of FIG. 2.

Please refer to FIG. 3. In the illustrated preferred embodiment, the drill section 12 includes a first flute 123a and a second flute 123b, which are located at two diametrically opposite sides of the drill section 12. The first and the second flute 123a, 123b are respectively extended from the first step 121a through the second, the third, the fourth and the fifth step 121b-121e to the tip 122. Further, the first and the second flute 123a, 123b respectively form a linear path on the drill section 12 extending in the drilling direction D1.

It is understood the above-mentioned number of the steps 121 and of the flutes 123 are only illustrative to facilitate convenient description of the present invention and not intended to limit the present invention in any way. That is, the number of the steps 121 can be three or four, depending on different types of implants 2; and the number of the flutes 123 can be one or three or more. Alternatively, the flutes 123 may respectively form a helical path along the drill section 12.

As shown in FIG. 2, each of the first to the fourth step 121a-121d has a lower peripheral edge formed into an annular bottom bevel 124. An end of each of the bottom bevels 124 located adjacent to another step 121 forms a recessed section 125, while the other end of the bottom bevel 124 forms a cutting edge 126. Thus, the lower peripheral edges of the steps 121, that is, the bevels 124 or the tip 122, are respectively configured as a conical cutter for downward advancing into and removing a part of a material. With this conical cutter-like design, the rotational osteotome 1 of the present invention can advance in the drilling direction D1. Also, each of the steps 121 is provided with a circumferential annular slot 127, which is radially inward sunken into the drill section 12 to communicate with the first flute 123a and the second flute 123b. The circumferential annular slot 127 is formed around a top of each of the second to the fifth steps 121 and located adjacent to the recessed section 125 of another step 121 located above it, so that the bottom bevel 124 of the upper one step 121 goes down to a bottom in radial direction of the circumferential annular slot 127 of the lower one step 121.

Figure 4:
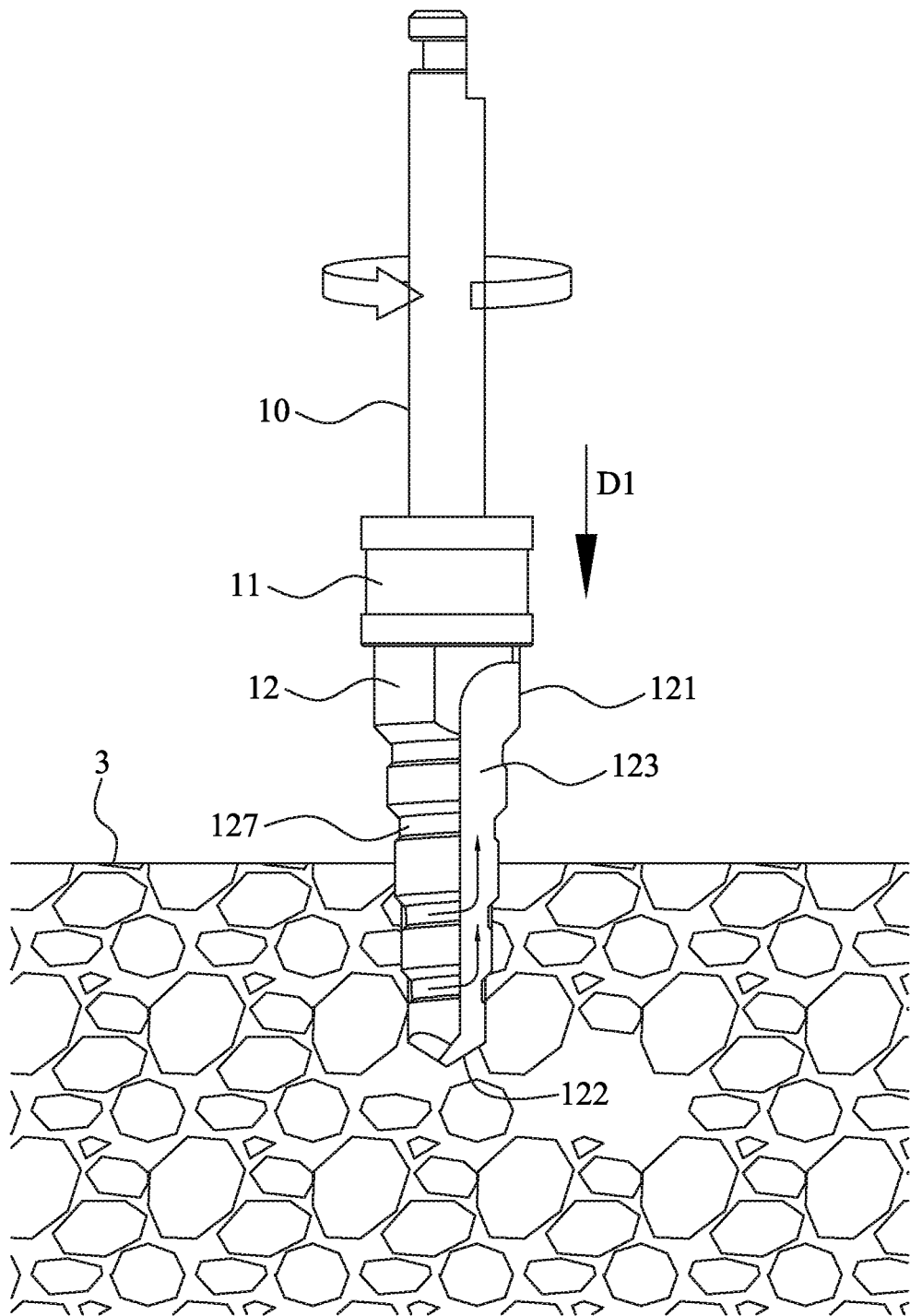
FIG. 4 shows the rotational osteotome of the present invention in drilling allows bone debris to be pulled out of the bone being drilled.
Figure 5:
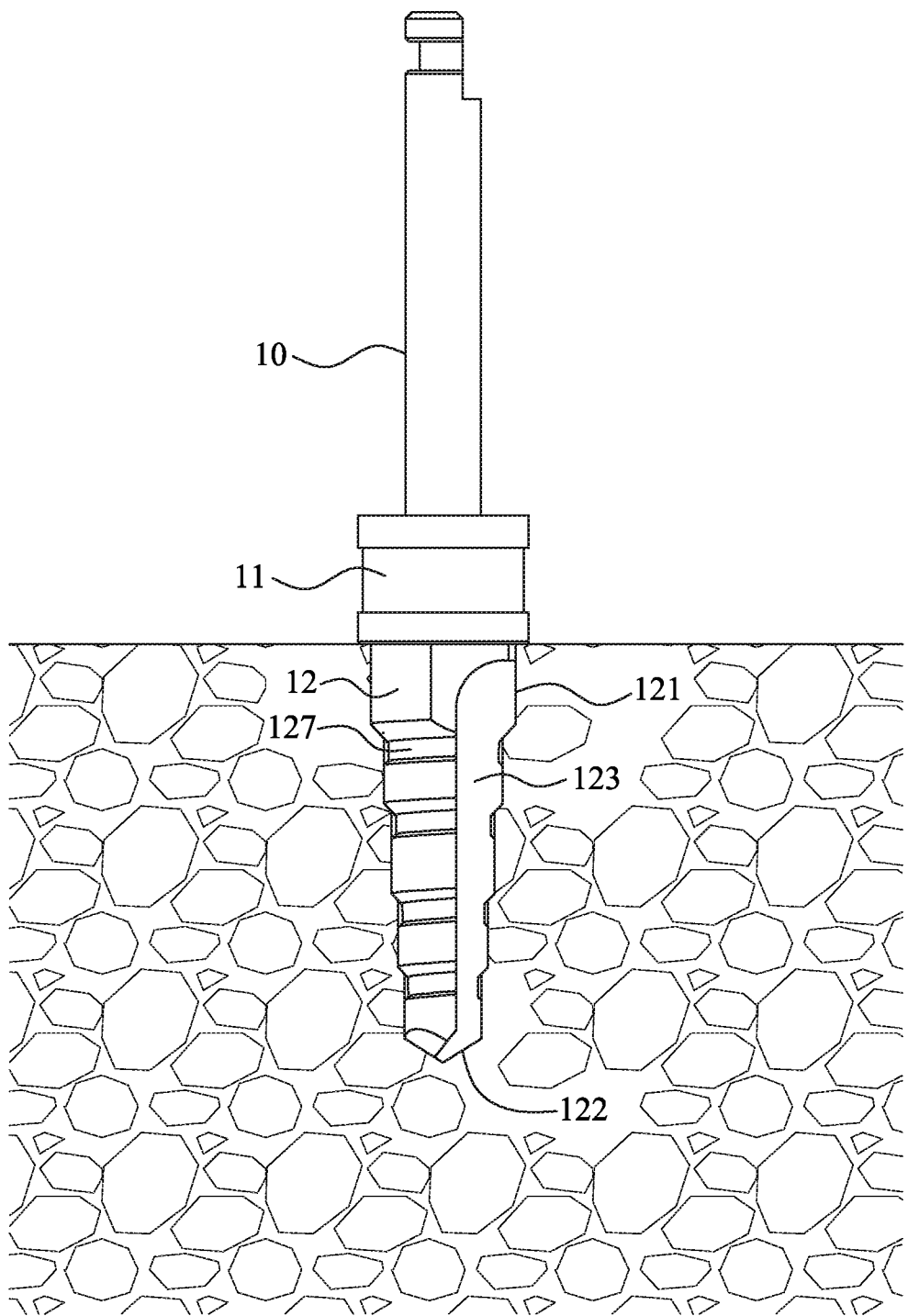
FIG. 5 shows the rotational osteotome of the present invention stops drilling when a stopper section thereof is in contact with the bone being drilled.

Please refer to FIGS. 4 and 5. When an initial hole is drilled into the alveolar bone 3 with the tip 122 of the rotational osteotome 1, bone debris so produced would move into the first flute 123a and the second flute 123b. When the initial hole on the alveolar bone 3 is further drilled by the bevels 124 of the rotational osteotome 1 for forming an implant hole 4 (see FIG. 6), a large part of the produced bone debris would move directly into the circumferential annular slots 127 located adjacent to corresponding bevels 124, while a small part of the produced bone debris would move directly into the first flute 123a and the second flute 123b. The bone debris moved into the circumferential annular slots 127 would then move further into the first flute 123a and the second flute 123b and is eventually discharged from the first and the second flute 123a, 123b to a space outside the partially formed implant hole 4.

As an alternative, in the case of having a relatively high drilling temperature, cooling water can be supplied into the first flute 123a and the second flute 123b to reduce the temperature of the whole rotational osteotome 1 in working, so as to protect tissues of the alveolar bone 3 against damaging by the overheated rotational osteotome 1.

Figure 6:
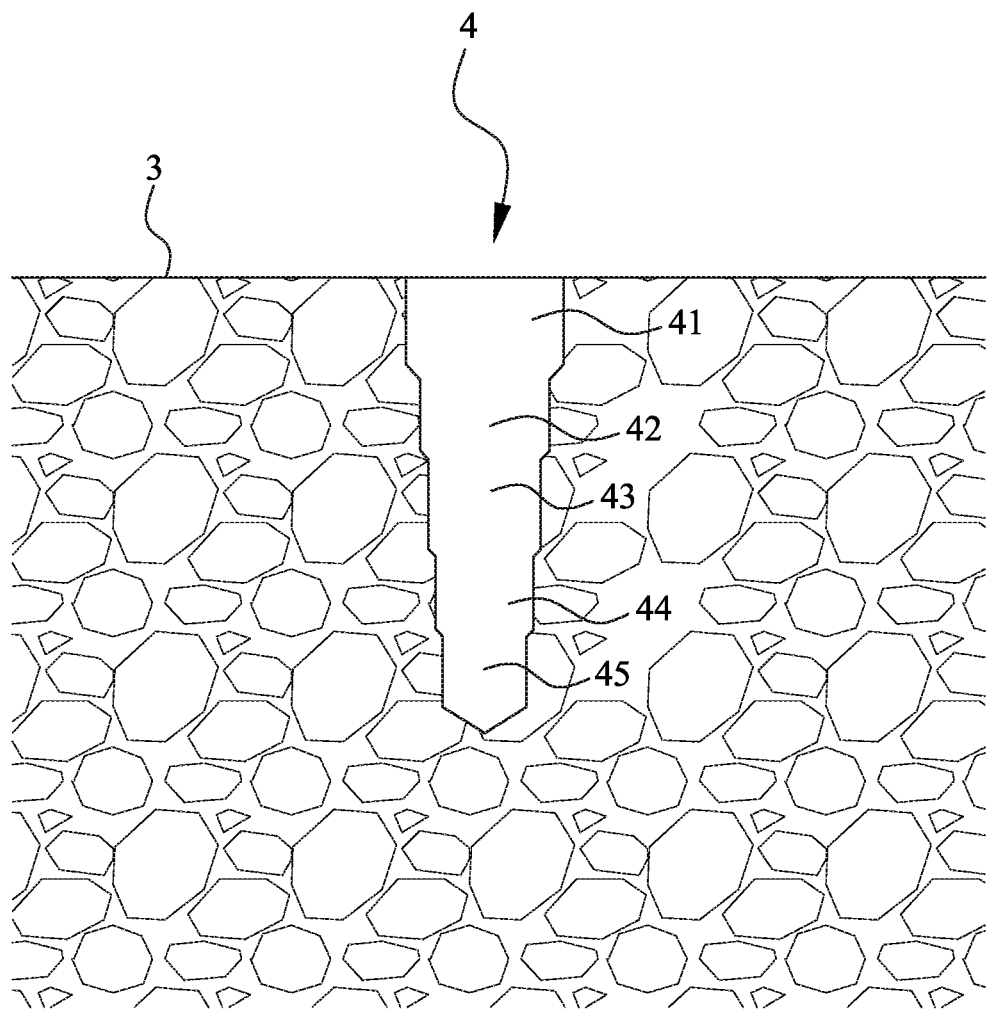
FIG. 6 shows an implant hole formed on the bone by the rotational osteotome of the present invention.

Please refer to FIGS. 5 and 6. When the fifth, the fourth, the third, and second and the first step 121e-121a sequentially advance into the alveolar bone 3 and the stopper section 11 is in contact with a top of the alveolar bone 3, the implant hole 4 is completed and internally includes a first sunken portion 41, a second sunken portion 42, a third sunken portion 43, a fourth sunken portion 44 and a fifth sunken portion 45 sequentially arranged from top to bottom. In this manner, the same implant hole 4 that previously required the use of multiple differently sized drill bits to form in the prior art can be now formed in only one drilling with one single rotational osteotome 1 of the present invention. Therefore, the time needed for the implantation surgery can be largely reduced.

Figure 7:
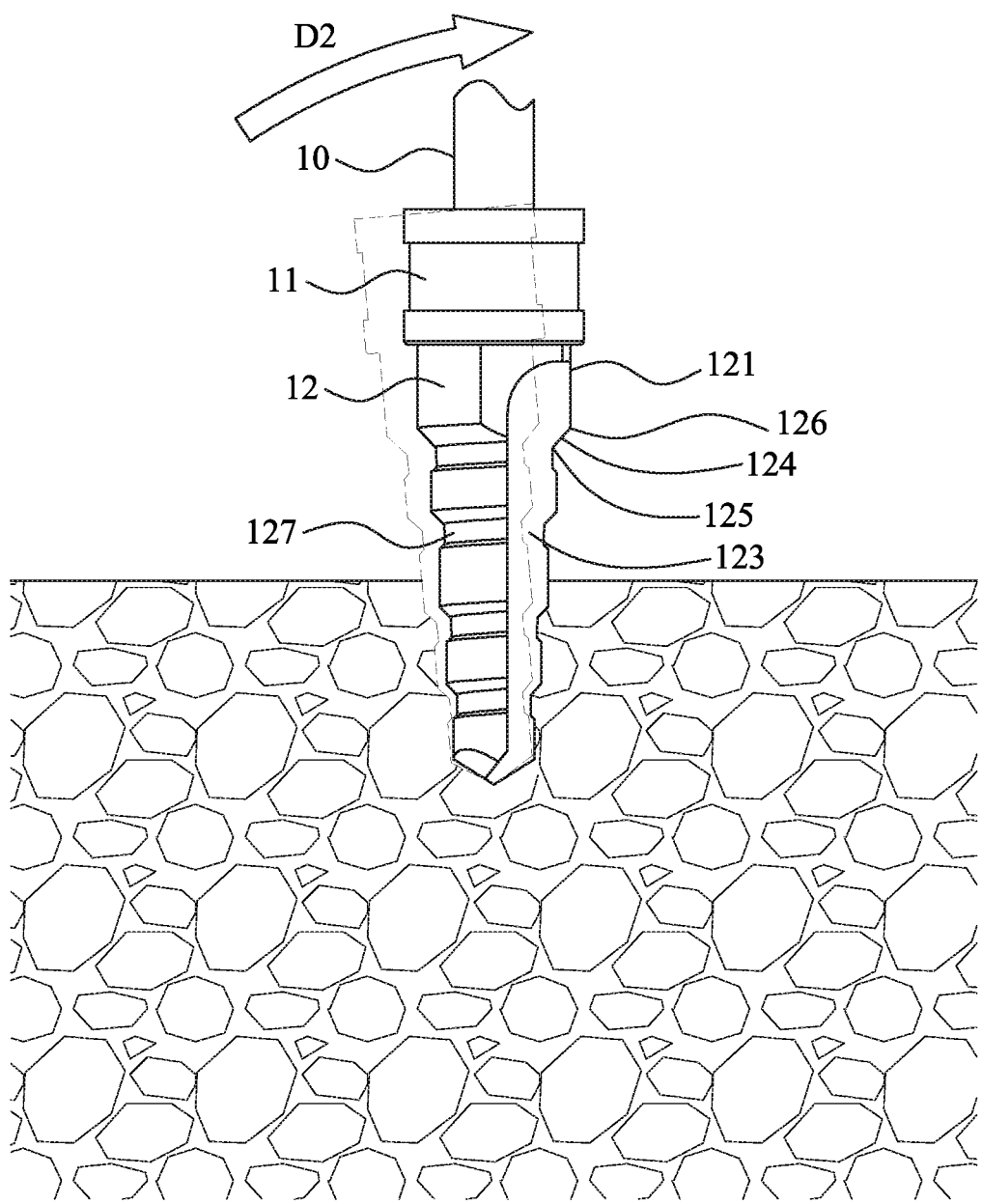
FIG. 7 shows the manner of corrective lateral cutting of the rotational osteotome when it drills in a skewed direction.

Please refer to FIG. 7. In the event the rotational osteotome 1 is found drilling in a direction deviated from the drilling direction D1, the cutting edges 126 of the rotational osteotome 1 advance in a lateral cutting direction D2 that intersects with the drilling direction D1. Since the bevels 124 goes down to the bottom of the circumferential annular slots 127 in radial direction, the cut length of the cutting edges 126 in the lateral cutting direction D2 is increased in this situation.

Figure 8:
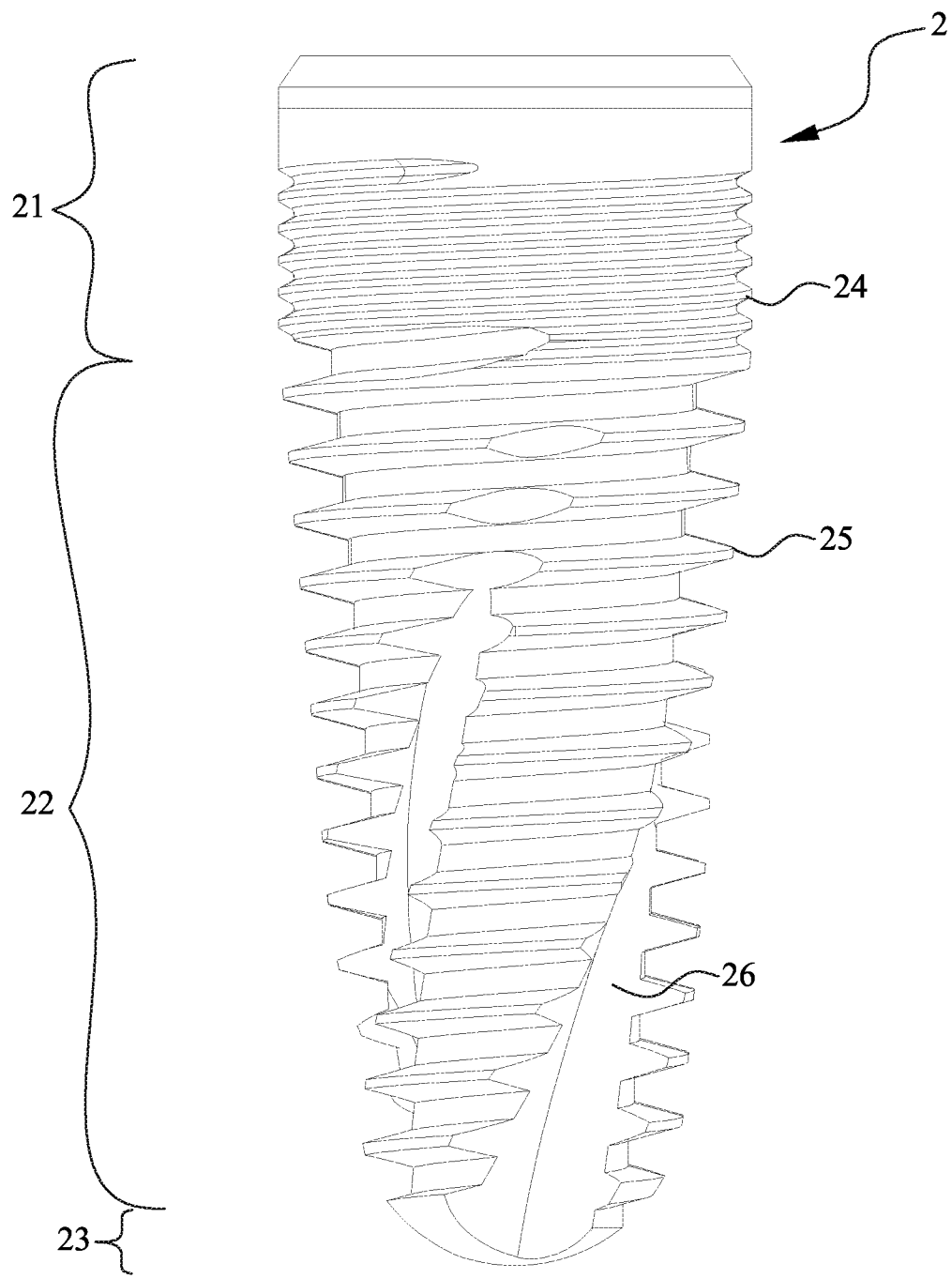
FIG. 8 is a side view of an implant included in the implantation kit of the present invention.

Please refer to FIGS. 1 and 8. The implant 2 includes a body 20 that can be entirely placed into the implant hole 4. The body 20 includes, from top to bottom, a cylindrical head section 21, a conical section 22 downward extended from the cylindrical head section 21, and a spherical surface 23 located at a bottom of the conical section 22. The cylindrical head section 21 is formed on a top thereof with a socket 211, into which a specific tool, such as a dental handpiece or a hand wrench, is fitted. The cylindrical head section 21 has an externally threaded round outer surface and the conical section 22 has an externally threaded round conical outer surface. The thread externally formed on the round outer surface of the cylindrical head section 21 is a fine thread 24 having a first thread pitch, and the thread externally formed on the round conical outer surface of the conical section 22 is a coarse thread 25 having a second thread pitch, which is larger than the first thread pitch.

A plurality of spiral flutes 26 is provided on the body 20 and the coarse thread 25. The spiral flutes 26 are circumferentially equally spaced on the implant 2 and respectively have a depth starting from a pitch circle of the coarse thread 25 down into partial thickness of the conical section 22 and a length extending from an upper end of the coarse thread 25 near the fine thread 24 to the spherical surface 23. An end of each spiral flute 26 at the spherical surface 23 has a first depth, and another end of each spiral flute 26 near the fine thread 24 has a second depth, which is smaller than the first depth, so that the spiral flute 26 has a variable depth gradually decreased from the spherical surface 23 toward the fine thread 24.

As shown in FIGS. 1 and 8, the spiral flutes 26 extend from the spherical surface 23 to an upper end 251 of the coarse thread 25 located adjacent to the fine thread 24 along a helical path. It is noted the spiral flutes 26 have a helical direction the same as that of the coarse thread 25, so that redundant bone debris from the bone drilling is upward movable along the helical paths of the spiral flutes 26 from the spherical surface 23 of the implant 2 toward the upper end 251 of the coarse thread 25 and be discharged eventually.

In addition, the implant 2 has a centered rotation axis. Portions of the spiral flutes 26 located closer to the fine thread 24 are formed on the coarse thread 25 only. On the other hand, other portions of the spiral flutes 26 located closer to the spherical surface 23 are formed on both of the coarse thread 25 and the conical section 22 and are therefore, located deeper and closer to the centered rotation axis.

Figure 9:
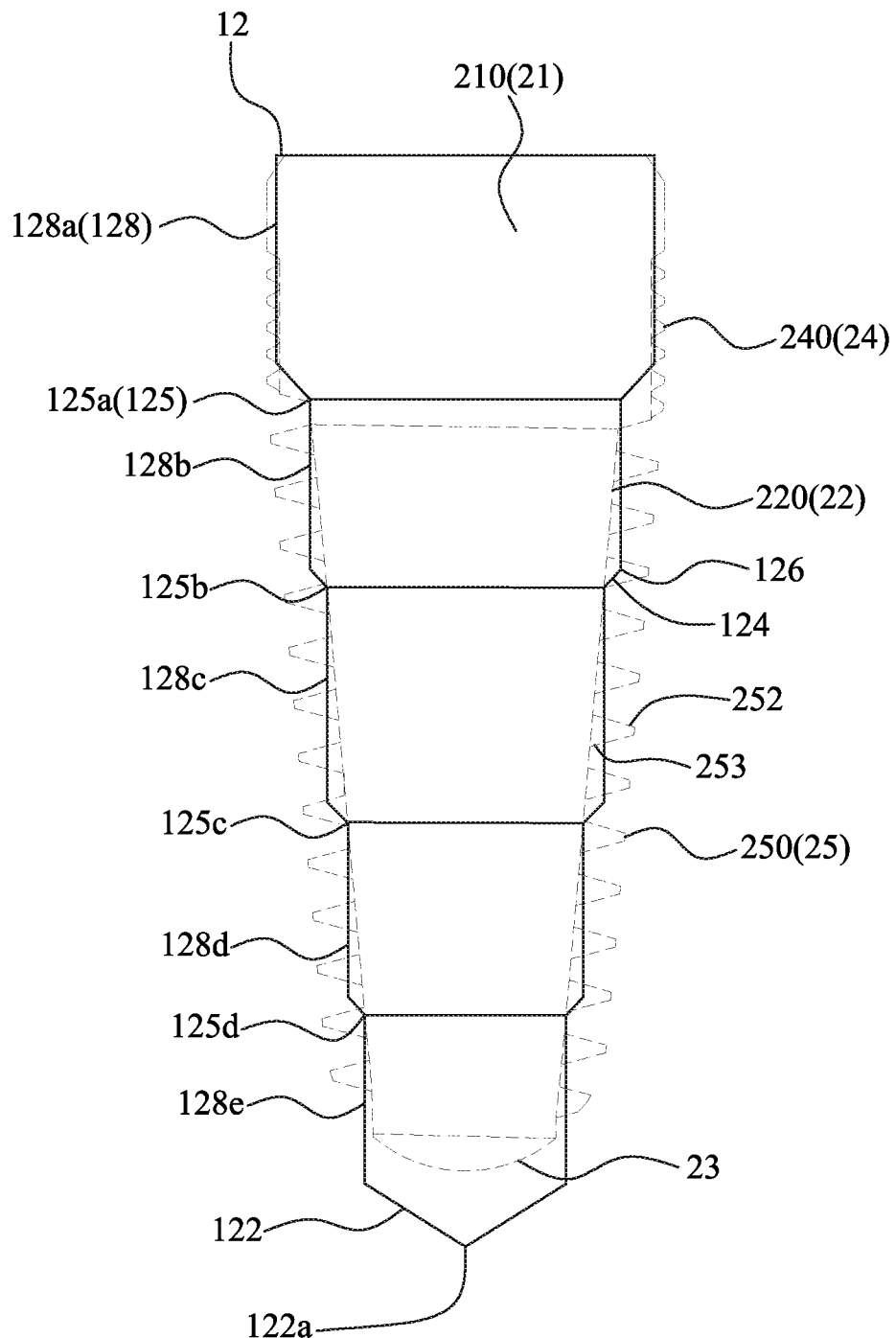
FIG. 9 schematically shows the rotational osteotome of the present invention has a drill section, the profile of which overlaps that of the implant of the present invention.

Please refer to FIG. 9. The implant 2 has a profile overlaps that of the drill section 12. The conical section 22 of the implant 2 is so configured that it has a downward tapered profile 220. The stepped profile 128 of the drill section 12 consists of a first step profile 128a, a second step profile 128b, a third step profile 128c, a fourth step profile 128d and a fifth step profile 128e. The tapered profile 220 has a pitch circle that is in contact with the first recessed section 125a of the first step 121a, the second recessed section 125b of the second step 121b, the third recessed section 125c of the third step 121c, and the fourth recessed section 125d of the fourth step 121d at the same time, such that the entire tapered profile 220 is located within the stepped profile 128 of the drill section 12 and in alignment with all the recessed sections 125. With these arrangements, the conical section 22 of the implant 2 being moved into the implant hole 4 would not exert any lateral stress on the alveolar bone 3.

The coarse thread 25 defines a first threaded profile 250 on a circumferential outer surface of the tapered profile 220. The first threaded profile 250 includes a plurality of blade edge sections 252 and a plurality of blade body sections 253. The blade edge sections 252 are protruded beyond the second step profile 128b, the third step profile 128c, the fourth step profile 128d and the fifth step profile 128e. Therefore, when the blade edge sections 252 are moved into the implant hole 4, they will cut the implant hole 4 again. The blade body sections 253 are located within the second step profile 128b, the third step profile 128c, the fourth step profile 128d and the fifth step profile 128e.

The cylindrical head section 21 of the implant 2 has a straight cylindrical profile 210, which has a diameter larger than that of the conical profile 220 and matching a diameter of the first step 121a. The fine thread 24 defines a second threaded profile 240 on the outer sides of the straight cylindrical profile 210. The second threaded profile 240 is entirely protruded beyond the first step profile 128a, and the fine thread 24 will also cuts the implant hole 4 when it is moved into the implant hole 4.

Figure 10:
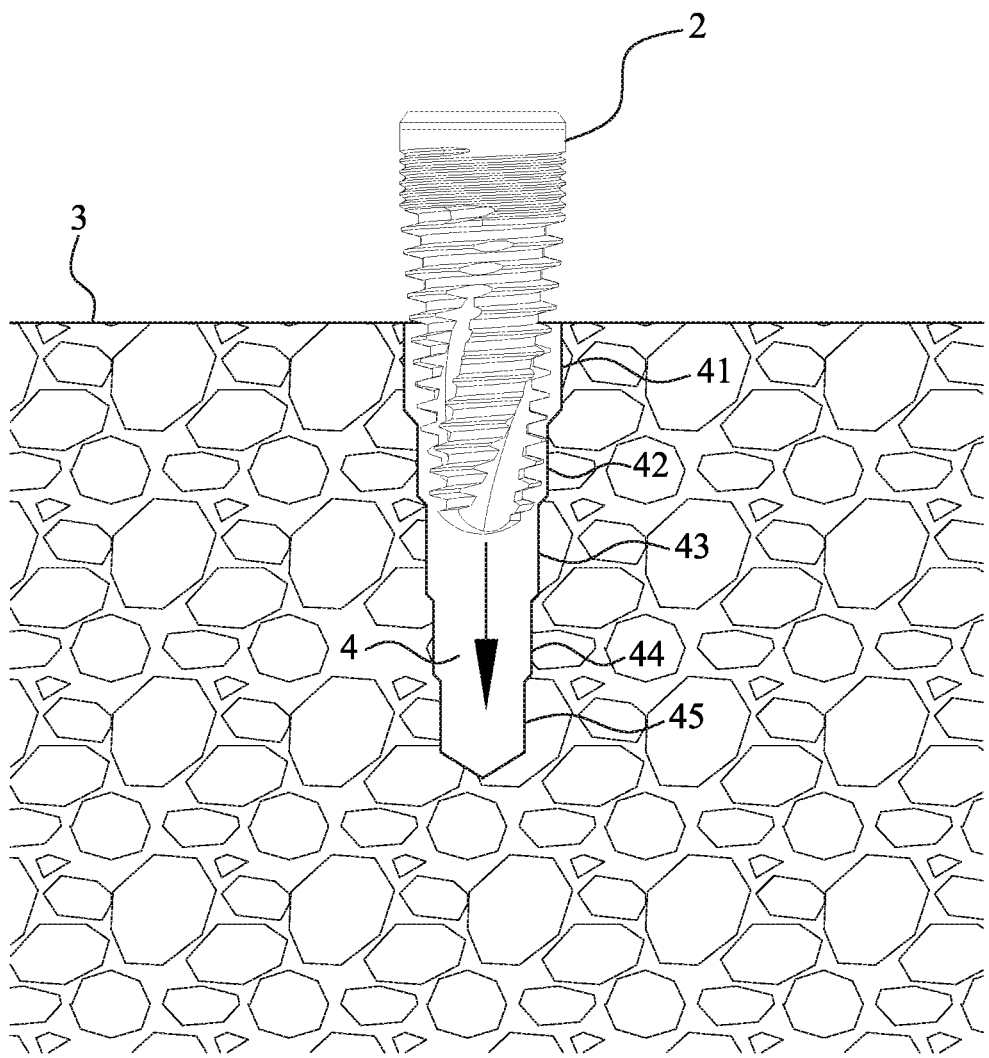
FIG. 10 shows the implant of the present invention is partially threaded into the implant hole formed by the rotational osteotome on the bone.
Figure 11:
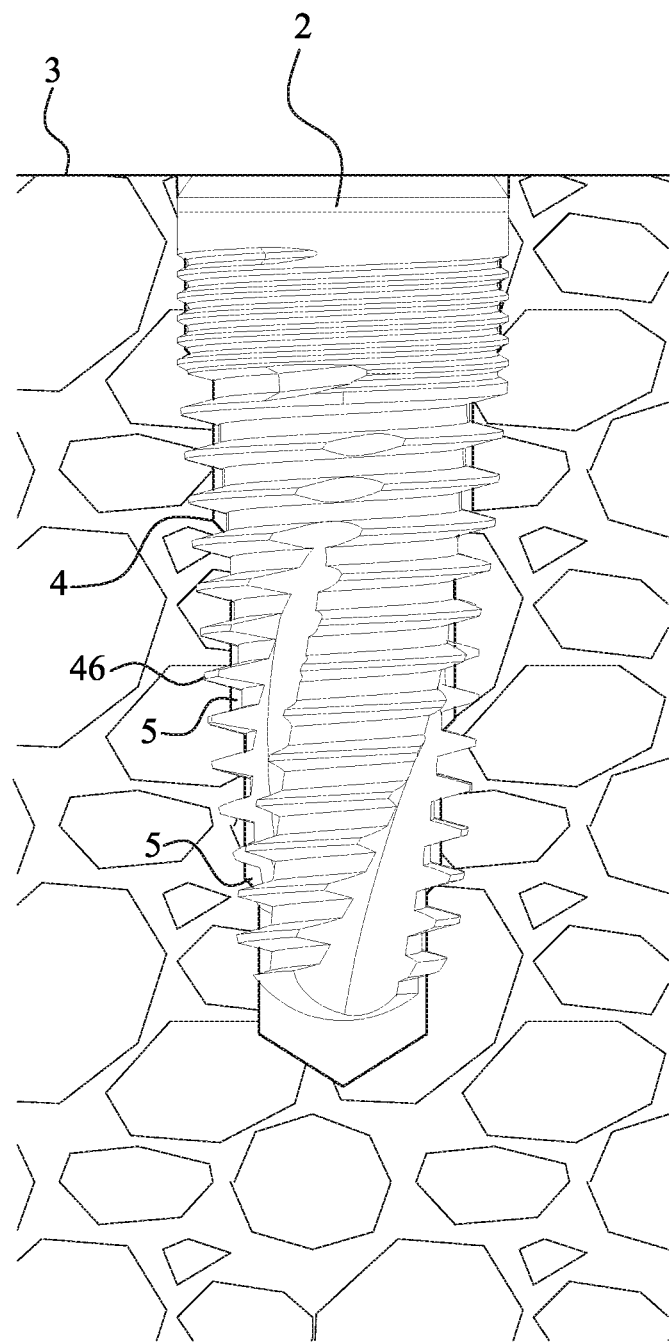
FIG. 11 shows the implant of the present invention is fully threaded into the implant hole formed by the rotational osteotome on the bone.

Please refer to FIGS. 10 and 11. When the implant 2 is screwed into the implant hole 4 by the rotary tool, a gap 5 is formed between the conical section 22 of the implant 2 and each of the first, the second, the third, the fourth and the fifth sunken portion 41, 42, 43, 44, 45 in the implant hole 4, and inner circumferential surfaces of the first, the second, the third, the fourth and the fifth sunken portion 41, 42, 43, 44, 45 are cut by the blade edge sections 252 to form a toothed rail 46 thereon. Partial space of the gap 5 is filled up by the blade body sections 253 of the coarse thread 25, while other space of the gap 5 is filled up with the bone debris produced when the blade edge sections 252 of the coarse thread 25 cut the implant hole 4. Redundant bone debris that could not be received in the gap 5 would move into the spiral flutes 26, from where the redundant bone debris is discharged upward into a space outside the implant hole 4 or is moved downward to a bottom of the implant hole 4.

Since the alveolar bone 3 is not subjected to any lateral stress and the gap 5 formed between the implant hole 4 and the implant 2 screwed into the implant hole 4 will be filled up with the bone debris, the time needed for osseointegration between the bone debris and the alveolar bone 3 is relatively shortened compared to the conventional dental implantation that forms an implant hole using multiple pieces of osteotomes to drill multiple times.

Figure 12:
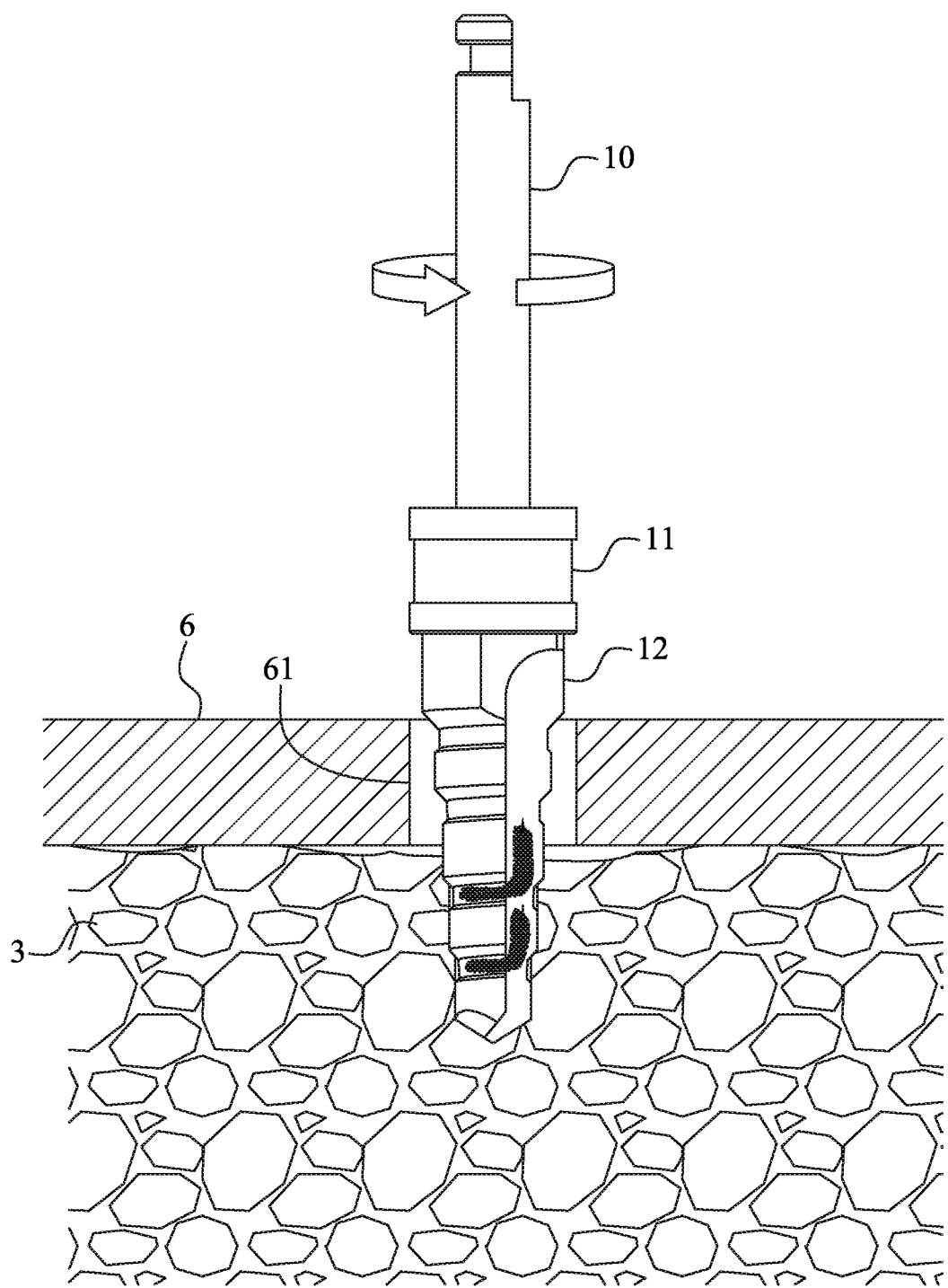
FIG. 12 shows the rotational osteotome of the present invention works with a guide board to drill the implant hole on the bone.
Figure 13:
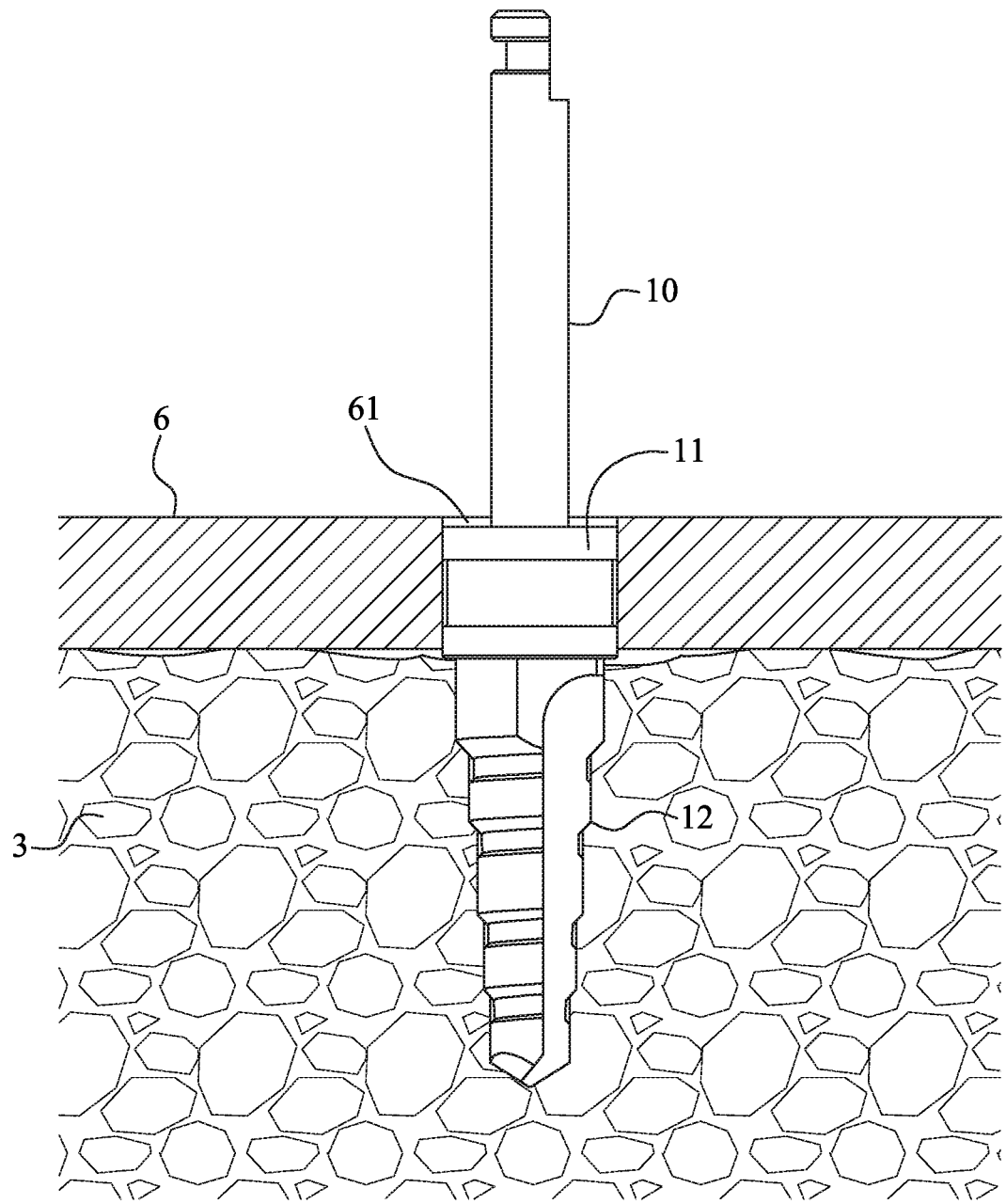
FIG. 13 shows the stopper section of the rotational osteotome of the present invention is moved into the guide board to expose from a bottom of the guide board.

Please refer to FIGS. 12 and 13. In another embodiment of the present invention, the implantation kit further includes a guide board 6 for use with the rotational osteotome 1. The guide board 6 includes at least one opening 61, which has a depth larger than or equal to a height of the stopper section 11 and a diameter match that of the stopper section 11, such that the stopper section 11 can linearly move through the opening 61 from a top thereof. When the annular surface portion 113 of the stopper section 11 gets in contact with the topmost point of the alveolar bone 3 and can not move downward any further, a part of the stopper section 11 is extended beyond a bottom of the opening 61.

Figure 14:
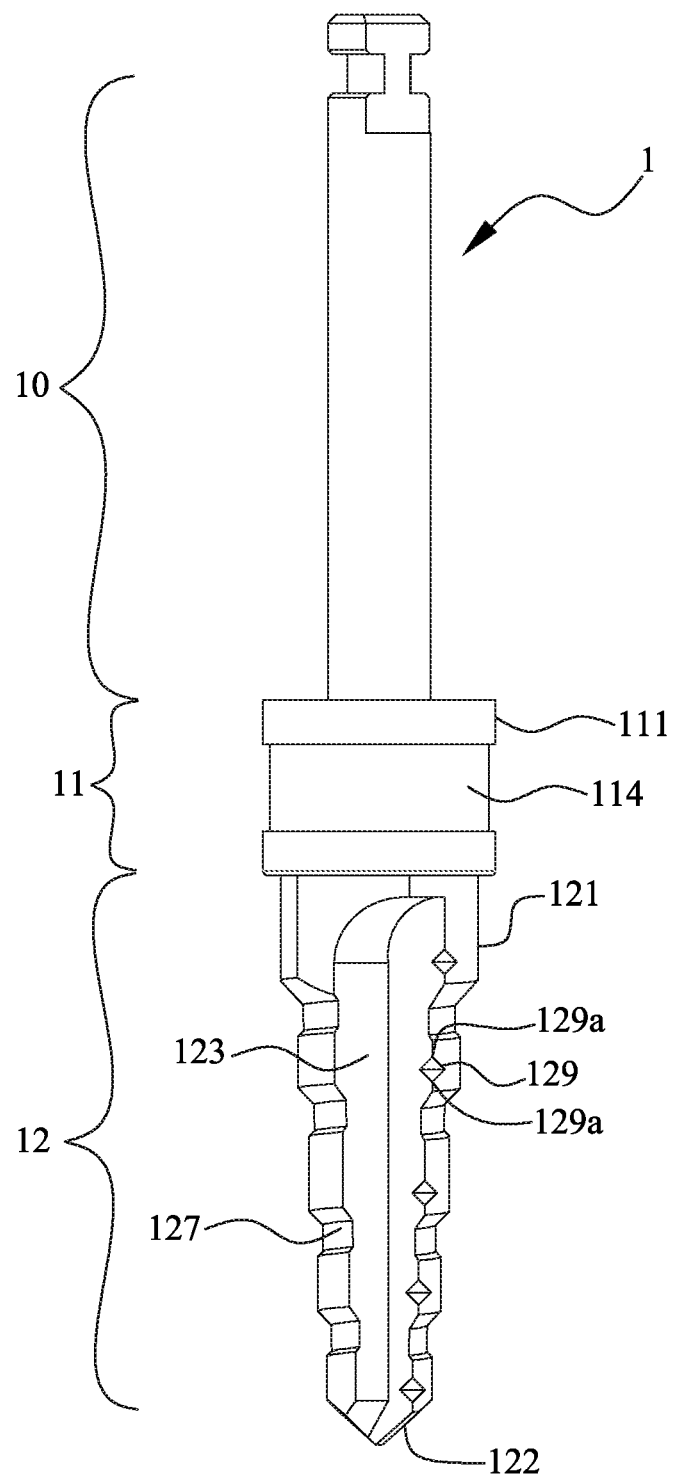
FIG. 14 is a side view of the rotational osteotome of the present invention according to another embodiment thereof.

As shown in FIG. 14, the rotational osteotome 1 according to a further embodiment of the present invention further includes an angular notch 129 formed between each step 121 and each flute 123, such that a plurality of sharp-pointed tips 129a are formed between the steps 121 and the flutes 123. When the rotational osteotome 1 drills the initial hole in a skewed direction relative to the drilling direction D1, the angular notches 129 enable the rotational osteotome 1 to cut laterally, so that the rotational osteotome 1 can gradually move away from the skewed direction and be finally adjusted back to the correct drilling direction D1.

When performing an implantation surgical operation using the implantation kit of the present invention, a first step is to examine the patient's oral cavity and obtain the current station of the patient's teeth and alveolar bone 3, and then determine a drilling location and a drilling depth after the state of the alveolar bone 3 is confirmed.

In a second step, the number of steps on the rotational osteotome 1 and the size of the implant 2 are selected according to the actual need and the determined drilling depth, so that the drill section 12 of the rotational osteotome 1 matches the drilling depth and has a downward tapered stepped profile 128, and the cylindrical head section 21 of the implant 2 matches the first step 121a having the largest diameter and the conical section 22 of the implant 2 is correspondingly aligned with all the recessed sections 125 formed on the steps 121.

In a third step, the rotational osteotome 1 is aligned with the drilling location and the drilling direction D1 and in contact with the alveolar bone 3, and the drilling continues until the stopper section 11 of the rotational osteotome 1 touches the topmost point of the alveolar bone 3, so that an implant hole 4 corresponding to the stepped profile of the drill section 12 is formed to complete the drilling. With the third step, it is able to avoid the problem of injuring the patient's facial nerve due to drilling too much into the alveolar bone 3 or being unable to place the implant 2 into the implant hole 4 due to insufficient drilling into the alveolar bone 3 by an inexperienced surgeon.

In a fourth step, the rotational osteotome 1 is removed from the implant hole 4 and the implant 2 is placed into the implant hole 4 in the drilling direction D1. The cylindrical head section 21 and the conical section 22 of the implant 2 are in contact with the implant hole 4 without exerting any lateral stress on the implant hole 4 while the coarse thread 25 and the fine thread 24 cut the inner walls of the implant hole 4 to form a toothed rail 46 thereon, and all gaps 5 between the implant hole 4 and the implant 2 are eventually filled up with the bone debris produced during drilling and cutting the implant hole 4. With this arrangement, a torsion force as high as 35N and more can be created between the alveolar bone 3 and the implant 2. Finally, an abutment is connected to the socket 211 the implant 2 and a crown is mounted on the abutment to complete the dental implantation surgery.

While the present invention is described as being applied to a dental implantation, it can be understood from the technical features of the present invention that it can also be widely applied to general orthopedic surgery without being limited to dentistry.

Figure 15:
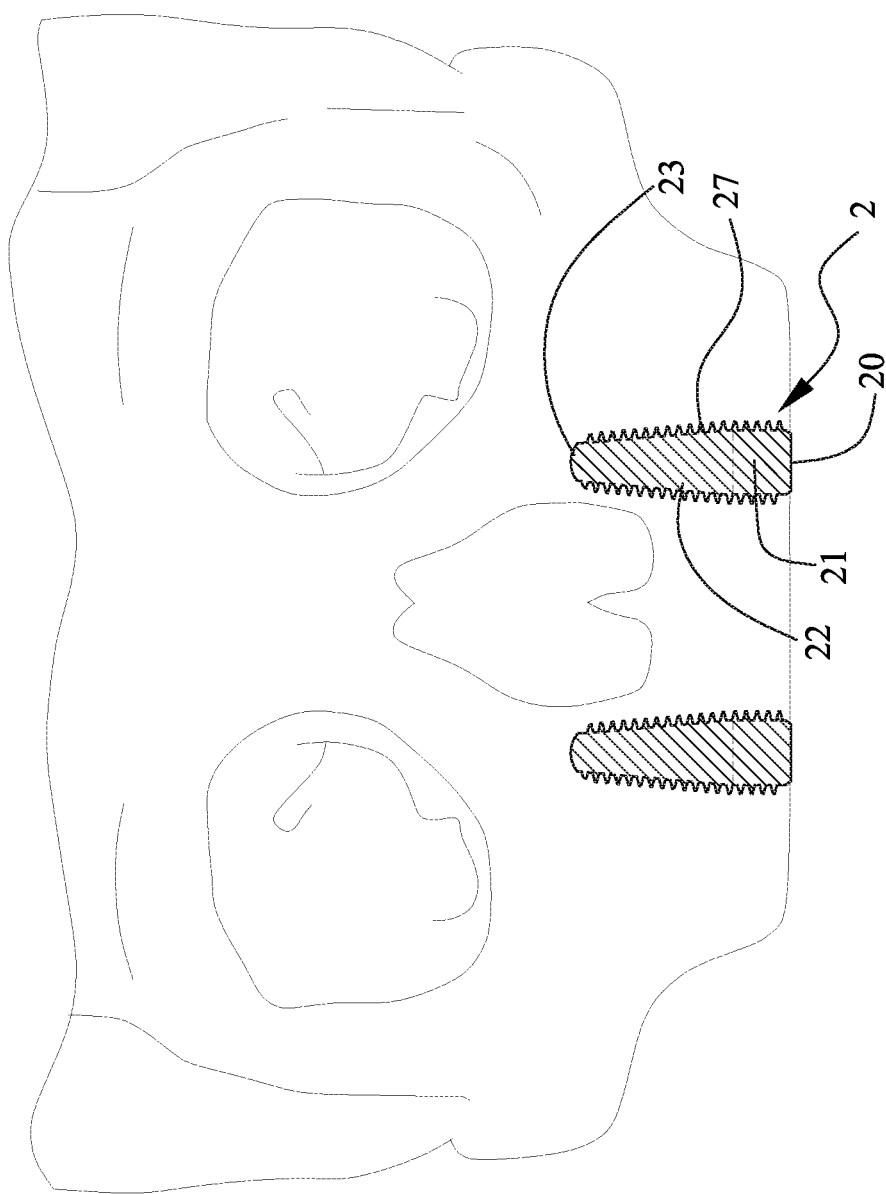
FIG. 15 shows the application of the implantation kit of the present invention in orthopedic surgery.
Figure 16A:
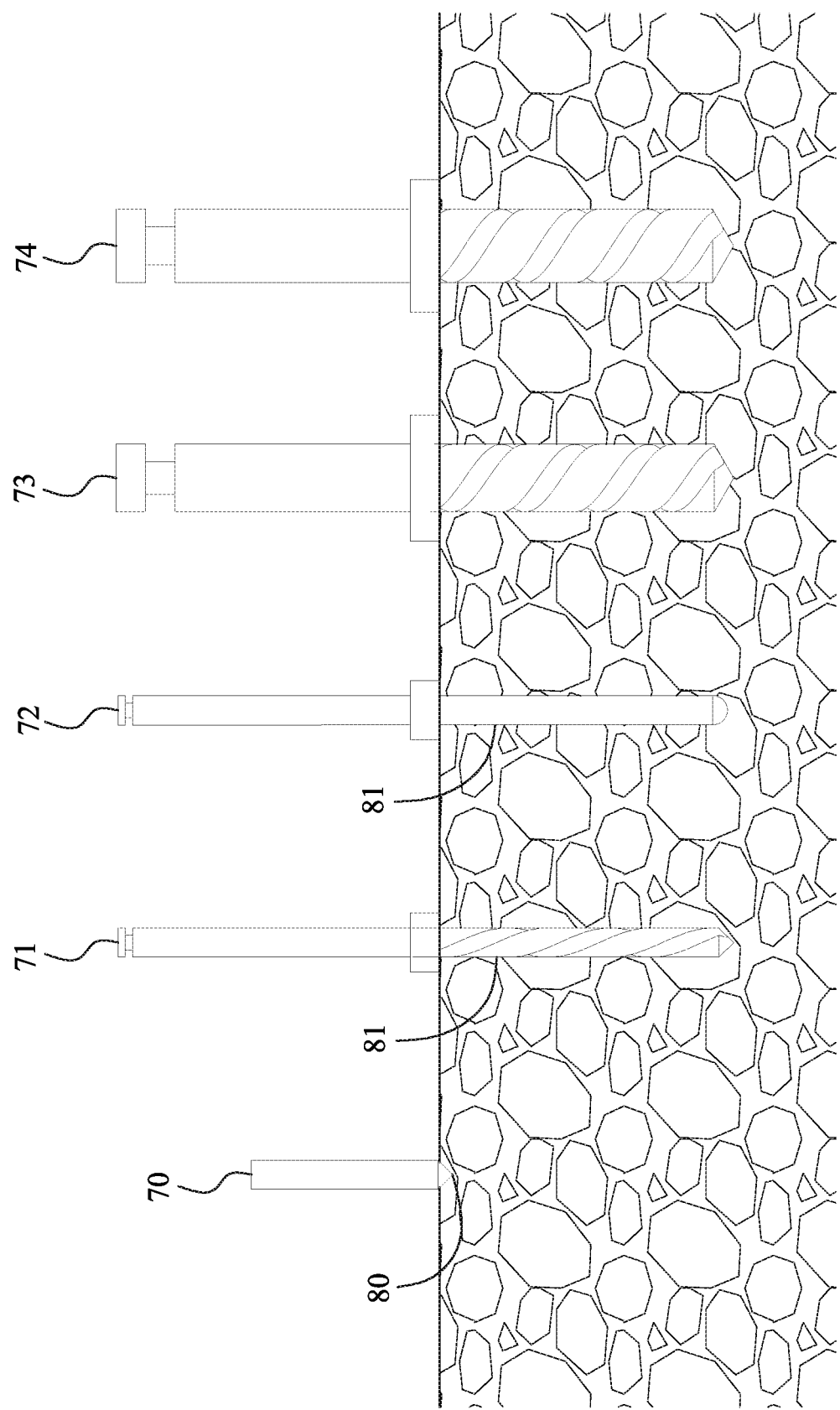
FIGS. 16A and 16B show the use of multiple drill bits in the prior art to form an implant hole for mounting an implant therein.
Figure 16B:
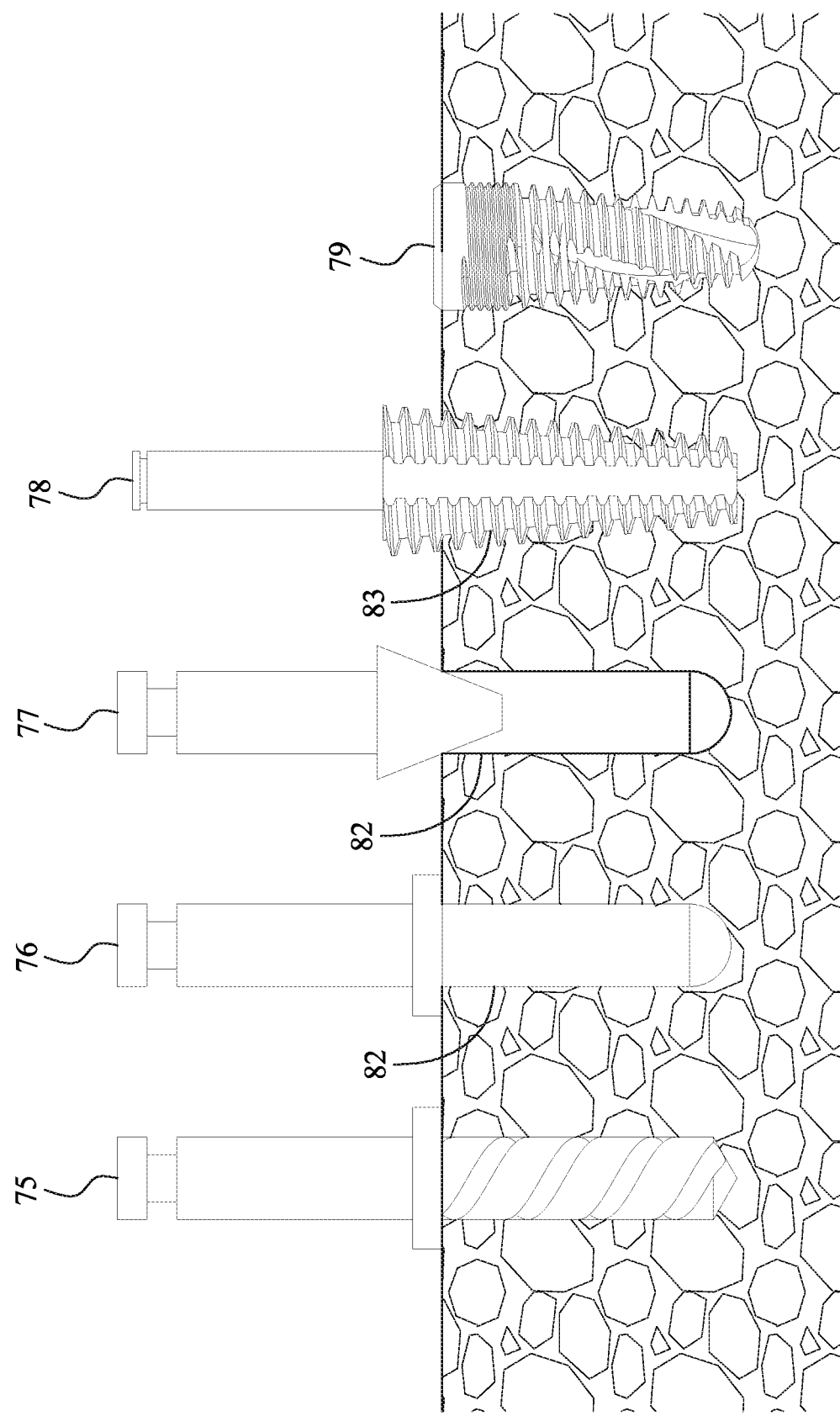

Please refer to FIG. 15. Alternatively, the implant 2 in the implantation kit of the present invention for placing into the patient's facial bones is externally provided with only a thread having a fixed pitch. In this case, as shown in FIG. 15, the body 20 of the implant 2 is formed on its outer surface with a fixed-pitch thread 27 that has a uniform pitch, and the spiral flutes 26 are extended from the spherical surface 23 upward to the cylindrical head section 21 of the body 20, with a non-grooved length (not shown) left between the upper ends of the spiral flutes 26 and the top of the cylindrical head section 21.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An implantation kit enabling implant hole preparation on bone in only one drilling with one single osteotome, comprising:
   a rotational osteotome including a shank section, a stopper section, and a drill section sequentially arranged in a drilling direction of the rotational osteotome,
      the shank section being configured to connect to a rotary tool,
      the drill section including a plurality of axially spaced steps of different diametrical sizes, a tip, and at least one flute,
      the steps being arranged between the stopper section and the tip and giving the drill section a stepped profile that is downward tapered in the drilling direction, and the steps respectively including an annular bottom bevel extended downward to a top of an adjacent lower one of the steps, such that the annular bottom bevels respectively have a cutting edge and a recessed section, and the cutting edge has a height different from the recessed section, and
      the tip having an apex point formed at one side of the tip opposite to the stopper section, and
      the flute being extended from the steps to the tip in the drilling direction; and
   an implant including a body, an external thread, and a plurality of spiral flutes,
      the body including a cylindrical head section and a conical section downward extended from the cylindrical head section,
      the cylindrical head section including a socket formed on a top of the cylindrical head section and having a straight cylindrical profile that matches one of the steps having the largest diameter,
      the conical section having a bottom formed into a spherical surface and a downward tapered profile correspondingly aligned with all the recessed sections of the steps,
      the external thread being formed around a round conical outer surface of the conical section and a round outer surface of the cylindrical head section and including a plurality of blade edge sections and a plurality of blade body sections, such that, when the implant is superimposed on the rotational osteotome, the blade edge sections are located outside the stepped profile of the steps, and the blade body sections are partially located in the stepped profile while remaining parts of the blade body sections being located outside the stepped profile of the steps, and the spiral flutes being formed on the external thread to downward extend to the spherical surface and having a depth starting from a pitch circle of the external thread down into a partial thickness of the conical section gradually.

2. The implantation kit as claimed in claim 1, wherein an implant hole is formed by the rotational osteotome into a bone, and the implant hole internally including a plurality of sunken portions corresponding to the steps of the drill section of the rotational osteotome; and the implant being fixedly placed in the implant hole with a gap formed between the implant and each of the sunken portions.

3. The implantation kit as claimed in claim 1, wherein the steps are respectively formed around a top of the step with a circumferential annular slot, the circumferential annular slot communicates with the at least one flute and is located adjacent to the recessed section of an upper one step, such that the bottom bevel of the upper one step goes down to a bottom in a radial direction of the circumferential annular slot of an adjacent lower one step to give the cutting edge of the upper one step an increased cut length.

4. The implantation kit as claimed in claim 1, wherein the implant has a centered rotation axis and a section of the external thread provided on the round conical outer surface of the conical section is a coarse thread while another section of the external thread provided on the round outer surface of the cylindrical head section is a fine thread; and portions of the spiral flutes located closer to the fine thread being formed on the coarse thread only, while other portions of the spiral flutes located closer to the spherical surface being formed on both of the coarse thread and the conical section to be located deeper and closer to the centered rotation axis.

5. The implantation kit as claimed in claim 4, wherein the spiral flutes extend from the spherical surface to an upper end of the coarse thread located adjacent to the fine thread along a helical path, and the spiral flutes have a helical direction the same as that of the coarse thread.

6. The implantation kit as claimed in claim 1, wherein the stopper section of the rotational osteotome is in the form of a cylinder having a diameter larger than that of the steps of the drill section; and a flat bottom surface of the cylinder including a central surface portion connected to an uppermost step of the drill section, and an annular surface portion located around the central surface portion.

7. The implantation kit as claimed in claim 1, wherein the stopper section of the rotational osteotome has an annular marking label provided around a circumferential outer surface of the stopper section.

8. The implantation kit as claimed in claim 1, wherein the rotational osteotome further includes an angular notch formed between each step and the at least one flute, such that a plurality of sharp-pointed tips are formed between the steps and the at least one flute.

9. The implantation kit as claimed in claim 1, further comprising a guide board; the guide board including at least one opening having a depth larger than or equal to a height of the stopper section and a diameter matching that of the stopper section, such that the stopper section can linearly move through the opening from a top of the guide board with a part of the stopper section extended beyond a bottom of the opening.

* * * * *